US008873728B2

(12) United States Patent
Brunson (10) Patent No.: US 8,873,728 B2
(45) Date of Patent: Oct. 28, 2014

(54) JOIN-US CALL-LOG AND CALL-ANSWER MESSAGES

(75) Inventor: Gordon Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1106 days.

(21) Appl. No.: 12/428,180

(22) Filed: Apr. 22, 2009

(65) Prior Publication Data

US 2010/0272245 A1 Oct. 28, 2010

(51) Int. Cl.
*H04M 3/42* (2006.01)
*H04M 11/00* (2006.01)
*H04M 1/00* (2006.01)
*H04L 12/16* (2006.01)
*H04Q 11/00* (2006.01)
*H04L 29/06* (2006.01)
*H04M 3/56* (2006.01)

(52) U.S. Cl.
CPC ............. *H04M 3/56* (2013.01); *H04L 65/1096* (2013.01); *H04M 2203/5018* (2013.01); *H04L 65/403* (2013.01)
USPC ................... 379/202.01; 379/93.21; 379/158; 370/260; 455/416

(58) Field of Classification Search
USPC ................... 379/202.01, 93.21, 158, 201.01, 379/207.01, 90.01, 93.01, 157; 370/259, 370/260, 261, 262; 455/14.1, 416, 414; 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS

| 6,539,219 | B1 | 3/2003 | Gallant et al. |
| 7,167,552 | B1 | 1/2007 | Shaffer et al. |
| 7,522,914 | B1 * | 4/2009 | Cook ............................ 455/417 |
| 2002/0002584 | A1 * | 1/2002 | Takagi et al. .................. 709/204 |
| 2004/0001446 | A1 * | 1/2004 | Bhatia et al. ................... 370/261 |
| 2005/0213739 | A1 * | 9/2005 | Rodman et al. ........... 379/202.01 |
| 2007/0081644 | A1 * | 4/2007 | Jachner .................... 379/106.01 |
| 2007/0097886 | A1 * | 5/2007 | Schwagmann et al. ........ 370/260 |
| 2007/0165810 | A1 | 7/2007 | Nguyen et al. |
| 2007/0172045 | A1 * | 7/2007 | Nguyen et al. ........... 379/202.01 |
| 2007/0280464 | A1 | 12/2007 | Hughes et al. |
| 2008/0159490 | A1 * | 7/2008 | Gaudin et al. ............. 379/88.16 |
| 2008/0212499 | A1 | 9/2008 | Maes |

(Continued)

FOREIGN PATENT DOCUMENTS

CN 101141689 3/2008
EP 1156654 11/2001

(Continued)

OTHER PUBLICATIONS

Search Report for UK Patent Application No. GB1005137.3, dated Jul. 19, 2010.
Official Action with English Translation for German Patent Application No. 102010010689.5, issued Oct. 2, 2012 9 pages.
Official Action with English Translation for Japan Patent Application No. 2010-098348, mailed Feb. 5, 2013 4 pages.

(Continued)

*Primary Examiner* — Khai N Nguyen
(74) *Attorney, Agent, or Firm* — Sheridan Ross P.C.

(57) ABSTRACT

The present invention provides methods, devices, and systems for facilitating an ad-hoc conference. More specifically, a "join-us" concept is employed that links functionality in non-real-time messaging systems with real-time ongoing state of calls information in a communications network. This combines the spontaneity and security of an ad-hoc conference call with the join-as-you-can nature of messaging and reservation of conference bridges.

24 Claims, 4 Drawing Sheets

(56) References Cited

U.S. PATENT DOCUMENTS

| | | | |
|---|---|---|---|
| 2009/0044132 A1* | 2/2009 | Combel et al. | 715/753 |
| 2010/0020947 A1* | 1/2010 | Van Gundy et al. | 379/88.17 |
| 2010/0189241 A1* | 7/2010 | Miller et al. | 379/202.01 |

FOREIGN PATENT DOCUMENTS

| | | |
|---|---|---|
| JP | S62-209957 | 9/1987 |
| JP | H09-55809 | 2/1997 |
| JP | 2007-300245 | 11/2007 |
| KR | 100848013 | 7/2008 |
| KR | 20090013341 | 2/2009 |
| WO | WO 2009/021164 | 2/2009 |

OTHER PUBLICATIONS

Official Action with English Translation of China Patent Application No. 201010167779.8, dated Jul. 2, 2013 19 pages.

Official Action for Korea Patent Application No. 2010-0037572, dated Aug. 29, 2013 6 pages.

Official Action with English Translation for China Patent Application No. 201010167779.8, dated Dec. 31, 2013 20 pages.

Official Action for German Patent Application No. 102010010689.5, dated Jan. 21, 2014 3 pages.

Official Action with English Translation for Japan Patent Application No. 2010-098348, mailed Apr. 3, 2014 4 pages.

Notice of Allowance with English Translation for Korea Patent Application No. 2010-0037572, dated Mar. 11, 2014 3 pages.

* cited by examiner

JOIN-US CALL-LOG AND CALL-ANSWER MESSAGES

FIELD OF THE INVENTION

The invention relates generally to communication systems and more particularly to ad-hoc conferencing solutions.

BACKGROUND

Often business communications involve consultation with three or more parties. Today the process of setting up ad-hoc conferences is cumbersome if the party to be joined to the conference does not answer the phone. Instead of completing the conference with a conference join, the caller must drop the attempted new call leg. Conferencing can be further complicated if the missed party tries to return the call in the midst of the ad-hoc conference. These return calls are often simply ignored due to the possible disruption of the conference and the possibility that the caller is calling for a different reason than the topic of the conference.

There have been some attempts to address such problems. As one example, U.S. Patent Application No. 2007/0172045, the entire contents of which are hereby incorporated by reference, teaches a system for establishing a conference call is provided. The system includes a handset operable to send a message containing a list of prospective participants for the conference call. The system also includes an application server operable to receive the message and invite at least some of the prospective participants. The application server is further operable, in response to receiving an acknowledgement from at least one of the prospective participants to participate in the conference call, to include the at least one of the prospective participants in the conference call.

As another example, U.S. Patent Application No. 2007/0280464, the entire contents of which are hereby incorporated by reference, teaches a call management service for a communications system that is configured to automatically: receive telephone call data identifying a destination end point and identifying a source end point; initiate a call-back telephone call to said source end point to set-up a first call leg responsive to receiving said telephone call data; initiate a telephone call to said destination end point to set-up a second call leg; combine said first and second call legs together thereby to provide voice communication between said source and destination end points; and transmit call leg status signals for said voice communication over a separate real-time communications connections signaling link to a communications client associated with at least one of said end points.

As yet another example, U.S. Pat. No. 7,167,552, the entire contents of which are hereby incorporated by reference, teaches a method for joining a meet-me conference call that includes presenting an option to specify a quorum associated with a meet-me conference call, in response to user input to an application program co-resident with a terminal. In one embodiment, the user input includes but is not limited to an indication that the user is requesting to join a meet-me conference call. In one embodiment, the presenting an option to specify a quorum is done in response to the user input includes but is not limited to an indication that the user is requesting to specify a quorum either at the time at which a meet-me call is being scheduled, or at a time prior to a time at which a meet-me conference call is to transpire.

As still another example, U.S. Patent Application No. 2007/0165810, the entire contents of which are incorporated by reference, teaches a system and method for initiating a conference call. The method consists of a first participant initiating a first telephony session with a second participant. The first participant then places the second participant on hold, initiates a second telephony session with a third participant, and initiates the conference call. A SIP REFER message related to the second and third participants is sent to an application server. A SIP INVITE message is sent to the second and third participants. The first telephony session is replaced with a session between the second participant and a conference bridge. The second telephony session is replaced with a session between the third participant and the conference bridge.

SUMMARY

Unfortunately, none of the above-referenced solutions efficiently address the problems associated with creating an ad-hoc conference. More specifically, none of the above-referenced solutions provide an easy way for a caller to send a conference invitation for an ad-hoc conference while they are engaged in another conference call that allows the initiator to return to the initial communication session while waiting for a join reply from the conference invitee. They also do not provide any reply options available to the invited party.

These and other needs are addressed by various embodiments and configurations of the present invention. The present invention is directed generally to a system, device, and method for creating an ad-hoc conference. Embodiments of the present invention simplify the establishment of ad-hoc conferences by marking call-log and voicemail call-answer messages that result when the party to be joined (ad-hoc conference invitee) is called with information required for that party to join later if the call is still in progress. The join operation takes place as if the call had been established on a pre-arranged conference bridge, except no bridge number or participant code is required. In accordance with at least one embodiment of the present invention, the method generally comprises:

receiving a join-us request from a first user that is currently engaged in a communication session with a second user, wherein an intended recipient of the join-us request is a third user;

transmitting the join-us request to the third user; and allowing the first user to engage in the communication session with the second user before the third user responds to the join-us request.

In accordance with at least some embodiments of the present invention, the implementation of "join-us" functionality employs coordination between a communications feature-server (e.g., a Private Branch Exchange (PBX) server or any other type of communications server used in a hosted environment or used by a service provider) and the Call Log application (often in the telephone or server in communication with a telephone) and Call-Answer application (within a voicemail server). This feature will be explained in the context of a SIP communications network although it may be implemented using a variety of communications protocols.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to create an ad-hoc conference.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
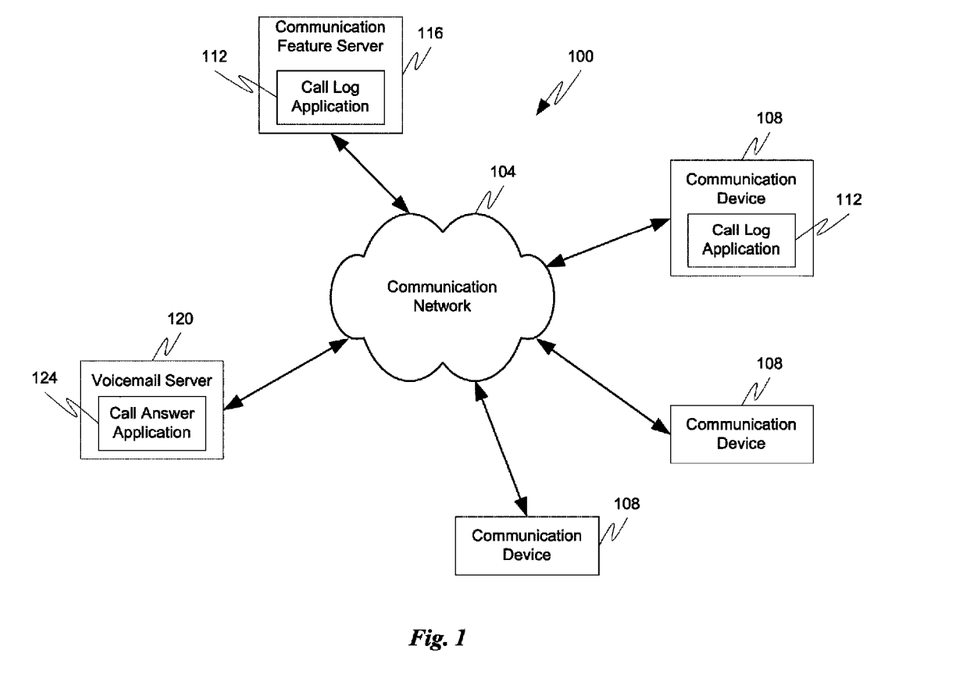
FIG. 1 is a block diagram of a communication system in accordance with embodiments of the present invention.

Referring now to FIG. 1, an exemplary communication system 100 will be described in accordance with at least some embodiments of the present invention. The communication system 100 may comprise a communication network 104 that facilitates communications between one or more communication devices 108.

The communication network 104 may be any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types.

The communication devices 108 may be any type of known communication or processing device such as a personal computer, laptop, Personal Digital Assistant (PDA), cellular phone, smart phone, telephone, contact center resource, DCP phone, analog phone, or combinations thereof. The communication devices 108 may be controlled by or associated with a single user or may be adapted for use by many users (e.g., an enterprise communication device that allows any enterprise user to utilize the communication device upon presentation of a valid user name and password). In general, each communication device 108 may be adapted to support video, audio, text, and/or data communications with other communication devices 108. The type of medium used by the communication device 108 to communicate with other communication devices may depend upon the communication applications available on the communication device 108.

In accordance with at least one embodiment of the present invention, one or more of the communication devices 108 may comprise a call log application 112. The call log application may be a stand-alone application or a module of a larger application such as another communication application, an interface application for a communication application, or an operating system of the communication device 108. The call log application 112 may be enabled to store certain dialog information during a conference call and utilize such information if a user of the communication device 108 initiates a "join-us" request during a particular communication. The join-us request can be created at any time after a third party (not currently a participant to a communication session between at least two participants) has been identified. Once the communication session has ended, the "join-us" invitation may be altered to a "call to sender" invitation since it is no longer possible for the third party to join the communication session.

Although not depicted, the communication devices 108 may also include an internal processor, memory, a user output, a user input, a network interface, and other elements traditionally found in communication endpoints. The call log application 112 may be stored in the memory of the communication device 108 and may be executed by the processor of the communication device. Inputs for operating the various applications stored on the communication device 108 may be received at the user input (e.g., keyboard, touch-screen, pointer device, etc.) and results of executing the various applications on the communication device 108 may be rendered and displayed to the user via the user output (e.g., Cathode Ray Tube (CRT) screen, one or several Light Emitting Diodes (LEDs), a Liquid Crystal Display (LCD), a plasma screen, a ringer, a speaker, any other type of audio output, and combinations thereof). The network interface of the communication device 108 may be used to facilitate the connection between the communication device 108 and the communication network 104. Examples of network interfaces include, without limitation, a network interface card, a modem, a wired telephony port, a serial or parallel data port, radio frequency broadcast transceiver, a USB port, or other wired or wireless communication network interfaces.

Although only three communication devices 108 are depicted, one skilled in the art will appreciate that embodiments of the present invention are not so limited. More particularly, the present invention provides a way of establishing an ad-hoc conference between two communication devices 108 already in a communication session and another party at a third communication device 108. These additional devices may or may not include a call log application 112. Additional communication devices 108 may also be added to the communication session on an ad-hoc basis. Utilization of the present invention provides a way for inviting many participants to an ad-hoc conference in a very short amount of time without requiring the initiator to wait for a response from the invitees.

Additionally, a communication device 108 may subscribe to communication services offered by a communication feature server 116. As one example, the communication server 116 may correspond to a Private Branch Exchange (PBX) server, although other types of servers may be employed in accordance with embodiments of the present invention. In accordance with at least one embodiment of the present invention, the communication server 116 is adapted for user by a particular entity or enterprise, as opposed to one that a common carrier or telephone company operates for many businesses or for the general public. The communication server 116 may also be enabled to connect enterprise endpoints to the public switched telephone network (PSTN) via trunk lines. Because they incorporate telephones, fax machines, modems, and more, the general term "extension" is used to refer to any end point on the branch.

As can be seen in FIG. 1, the communication server 116 may comprise a call log application 112 in addition to or in lieu of call log applications 112 residing on the communication devices 108. In accordance with at least one embodiment of the present invention, the communication server 116 may manage call logs 112 for many communication devices 108 if such devices do not have their own call log 112.

In accordance with at least one embodiment of the present invention, the communication feature server 116 may also be enabled to facilitate conferences between multiple communication devices 108. Thus, the communication feature server 116 may comprise a conference bridge that is secured by certain parameters (e.g., participant codes, dial-in numbers, passwords, etc.).

The communication system 100 may further comprise a voicemail system 120 or a number of voicemail systems adapted to act as coverage when a user does not answer an incoming call at their communication device 108. When a call is diverted from the communication device 108 to the voicemail server 120, the voicemail server 120 is adapted to utilize a call answer application 124 to interact with the caller and obtain a message or other types of relevant information from the caller. The caller may leave a short message as well as their callback number, name, times of availability, etc. This information may be stored on the voicemail server 120 or on a separate database that is readily accessible by the voicemail server 120. The intended call recipient may then retrieve such information from the voicemail server 120 via their own communication device 108.

Figure 2:
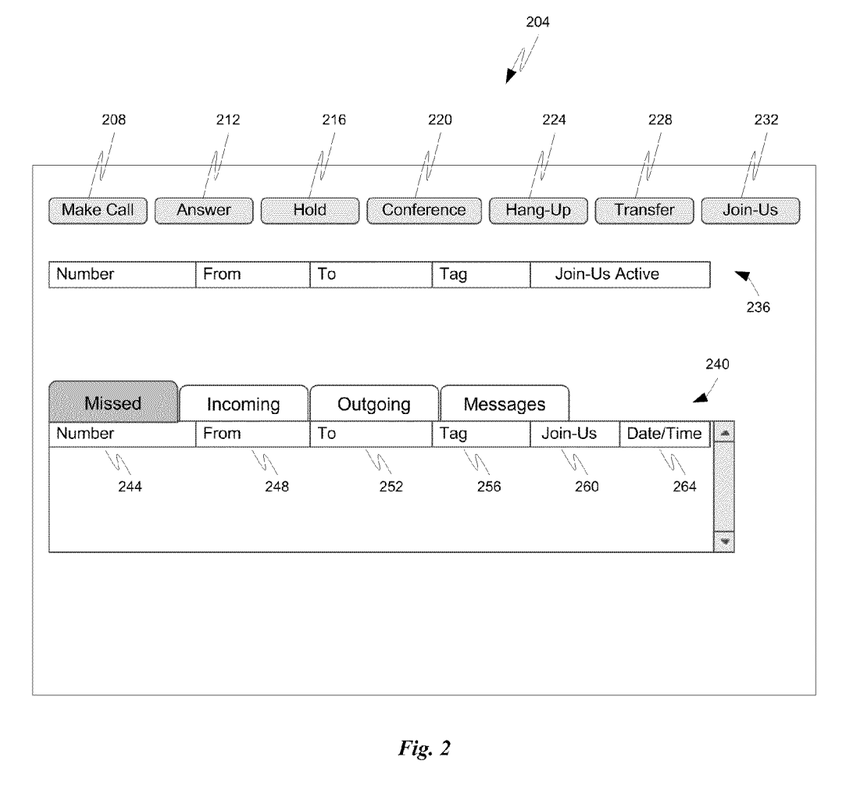
FIG. 2 is a block diagram depicting a graphical user interface in accordance with embodiments of the present invention.

With reference now to FIG. 2, an exemplary graphical user interface 204 will be described in accordance with at least some embodiments of the present invention. The graphical user interface 204 may be displayed to a user via a user output provided on or associated with the communication device 108. The graphical user interface 204 may be associated with a particular communication application or a general user application (e.g., an operating system). The graphical user interface 204 may be utilized by a user of the communication device 108 to access and implement various functions in accordance with embodiments of the present invention. The graphical user interface 204 may comprise a number of user inputs such as a make call input 208, an answer input 212, a hold input 216, a conference input 220, a hang-up input 224, a transfer input 228, and/or a join-us input 232. Each of these inputs may be utilized to administer various call functions offered by the communication device 108 and/or other components in the communication system 100.

In addition to its various user inputs, the user interface 204 may also comprise an area for depicting current call information 236 and an area for depicting historical call information 240. Information depicted in the current call information area 236 may include, but is not limited to, caller identification information, callee identification information, the number or extension of the caller and/or callee, tag information (i.e., whether any tags have been associated with the current call), and whether or not join-us functionality has been implemented for the current call. As can be appreciated by one skilled in the art a greater or lesser amount of information may be displayed in the current call information area 236, depending upon user needs, preferences, and/or system settings.

Information depicted in the historical call information area 240 includes, without limitation, a missed call log, an incoming call log, an outgoing call log, and a messages log. One or more of these logs may render information in various data fields such as a caller/callee number identification field 244, a caller field 248, a callee field 252, a tag field 256, a join-us field 260, and a date/time field 264. Information maintained and displayed in the historical call information area 240 may be managed by the call log application 112 on the communication device 108. Alternatively, or in addition, a remote application or functionality within the communication server 116 may be responsible for obtaining and managing information depicted in the call logs.

Figure 3:
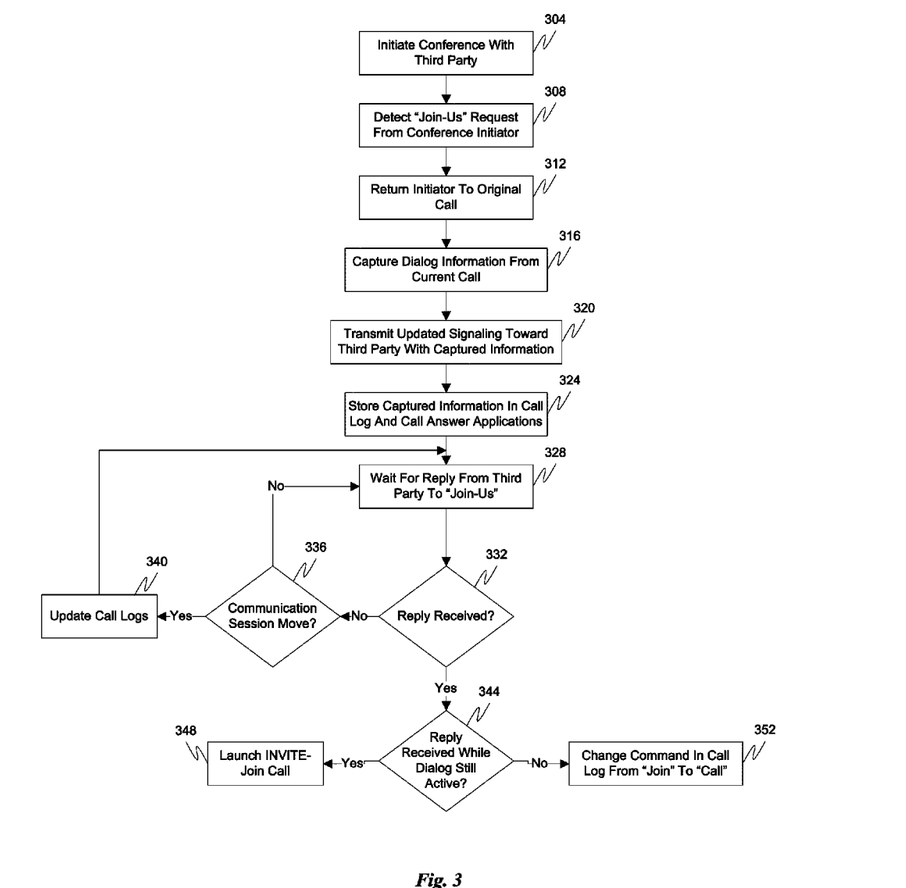
FIG. 3 is a flow diagram depicting a first ad-hoc conferencing method in accordance with embodiments of the present invention.

Referring now to FIG. 3, an exemplary ad-hoc conferencing method will be described in accordance with at least some embodiments of the present invention. The method generally begins when a participant in a current communication session decides to initiate a conference call with a third party not currently participating in the communication session (step 304). The initiating participant may begin initiating the conference with the third party either during call set up of the current communication session or after the communication session has been established (i.e., after a connection has been made between two or more communication devices 108). This initial action may be performed when the conference input 220 is pressed during an established call by the initiator of the conference. The initiator may also provide dialing information for the third party during this step. All of these actions may cause the communication device 108 associated with the initiating user to dial a communication device 108 associated with the third party.

At any time the initiator may press the join-us input 232 instead of pressing the conference input 220 a second time (step 308). While this is one way of initiating a join-us invitation, there are other possible ways of initiating a join-us invitation without requiring multiple user inputs (e.g., selection of the join-us input 232 twice or selection of a conference input then join-us input 232). For instance, it may be possible for a communication session participant to initiate a join-us invitation without being removed from the existing communication session media. In this example, a participant may select an input on their communication device 108 user interface 204 that allows the participant to select a third party and this single input may initiate the join-us invitation without interrupting the communication session. The third party may be dialed by number or may be selected from an available database or directory.

When the join-us input 232 is selected, the caller is returned immediately to the original call with the expectation that the party-to-be-added (i.e., the third party) will join if and when they can (step 312). Simultaneously, or shortly thereafter, dialog information is captured from the current call (step 316). Dialog information that is captured in this step may include, but is not limited to, bridge identification information (e.g., by number, address, or any other identifier), participant code(s), password(s), initiator identification information, initiator contact information, dialog information, information regarding other participants to the current call (e.g., by including current participant roster information in the join-us indicator left with the third party to help determine the size and infer the importance of the received request), and combinations thereof. In accordance with at least one embodiment of the present invention, the captured identifier is valid only for the duration of the existing live call. In other words, the join-us request is maintained as long as the communication session exists. Once the communication session ends, however, the join-us invitation may be altered to a call back option. This alteration may be executed automatically by the communication equipment upon determining that the state of the communication session has changed from an active communication session to a communication session that has ended (e.g., by subscribing to the ongoing state of the communication session and learning that the state has changed).

The method continues with the initiator's communication device 108 generating a message that includes some or all of the captured dialog information (step 320). In accordance with at least one embodiment of the present invention, this transmitted message may correspond to any type of known SIP message, such as an INVITE message, that includes some or all of the dialog information in the message header. In accordance with at least one embodiment of the present invention, the dialog information may also alter the alerting on the third party's communication device 108 to indicate that a "join-us" invitation is active. Additionally, other presence indicators may be updated in other applications. For example, a presence indicator in a particular communication application (e.g., Instant Messaging (IM) application, calendaring application, or the like) may be updated to show that the initiator is on the call and is busy.

Additionally, the captured dialog information is stored in the call log application 112 associated with the third party (and also possibly the initiator) and call answer application 124 (step 324). The updated signaling sent to the third party along with the dialog information contained therein is used by the call log 112 and call answer 124 applications to offer a "join-us" option to the messages/logs left as a result of the call attempt. Anytime a call-log entry is created for a call where the join-us input 232 has been pressed by an initiator whether it be a received call or a missed call, the call log 112 entry captures the dialog information so that the call can be rejoined at a later time as long as the call is still active. The call log application subscribes to dialog events to track the life of the call and show a live command button to join the call. Thus, after a "join-us" request has been transmitted and the appropriate actions have been taken to capture and store dialog information, the initiator engages in the current communication session while also waiting for a reply from the invited third party (step 328). A reply to the join-us request may include having the third party select their join-us input 232, answer the join-us call (i.e., take their communication device 108 off-hook in response to receiving the specialized "join-us" alerting), or somehow provide a positive indication of a desire to be included in the ad-hoc conference/communication session.

If no reply to the "join-us" invitation is received, then the method continues by determining whether the communication session has moved (step 336). If the communication session changes locations (e.g., due to the addition of more conference participants the conference has to be transferred from a local bridge on a phone to a remote conference bridge at a larger conference facility) after the join-us invitation has been sent but before the party-to-be-added has accepted the join-us invitation, a link may be maintained between the prior location of the communication session and the new location of the communication session, thereby enabling the party-to-be-added to follow the communication session with the join-us invitation. More particularly, the call-log information may be updated to reflect the movement of the communication session (step 340). The method then returns to step 328 to wait for a response from the third party.

If the party-to-be-added (i.e., the third party) selects this command while the dialog of the existing communication session is still active (as determined in step 344), an INVITE-join call will be launched and the parties in the original call will hear a conference join tone (and possibly a recorded name) as the new party is added (step 348). If the existing communication session is already on a public conference bridge requiring a participant security code (e.g., because there may be other participants who are dialing directly into the existing communication session), then the INVITE-join call message may also automatically enter the participant security code information. Also, if a web conference is part of the existing communication session, then the INVITE-join call message may also tell the joining party about the web conference or may even automatically open a web-browser for the joining party, thereby letting the joining party to immediately join the web conference as well as the other media for the existing communication session.

If the original dialog has ended, the command in the call log changes from "Join" to "Call" (step 352). This entry in the call log 112 may still be used to return the call to the initiator, but it will result in a fresh call, not the joining of an existing conference/communication session.

Since the join-us input 232 may be hit at any time by the initiator or the party-to-be-added, there are several other cases to consider. A few examples will be described in more detail with reference to FIG. 4. The method depicted in FIG. 4 begins in a similar fashion to the method depicted in FIG. 3. More specifically, a conference is initiated between at least two users (step 404) and then a "join-us" invitation is generated from one of the communication session participants (step 408). After the request is received, the initiator is returned to the original conference, although the initiator is not required to ever leave the communication session (step 412). Then dialog information is captured from the original conference (step 416), transmitted to the invitee via the invite signaling (step 420), and is stored in the call log 112 and call answer 124 applications (step 424). The parties to the original conference are then free to continue engaging in the conference before the invitee ever responds to the "join-us" invitation. Thus, the system waits to receive a reply from the invitee (e.g., a response to the join-us invitation) before processing the join-us request, but still allows the original communication session/conference to continue (steps 428 and 432).

Figure 4:
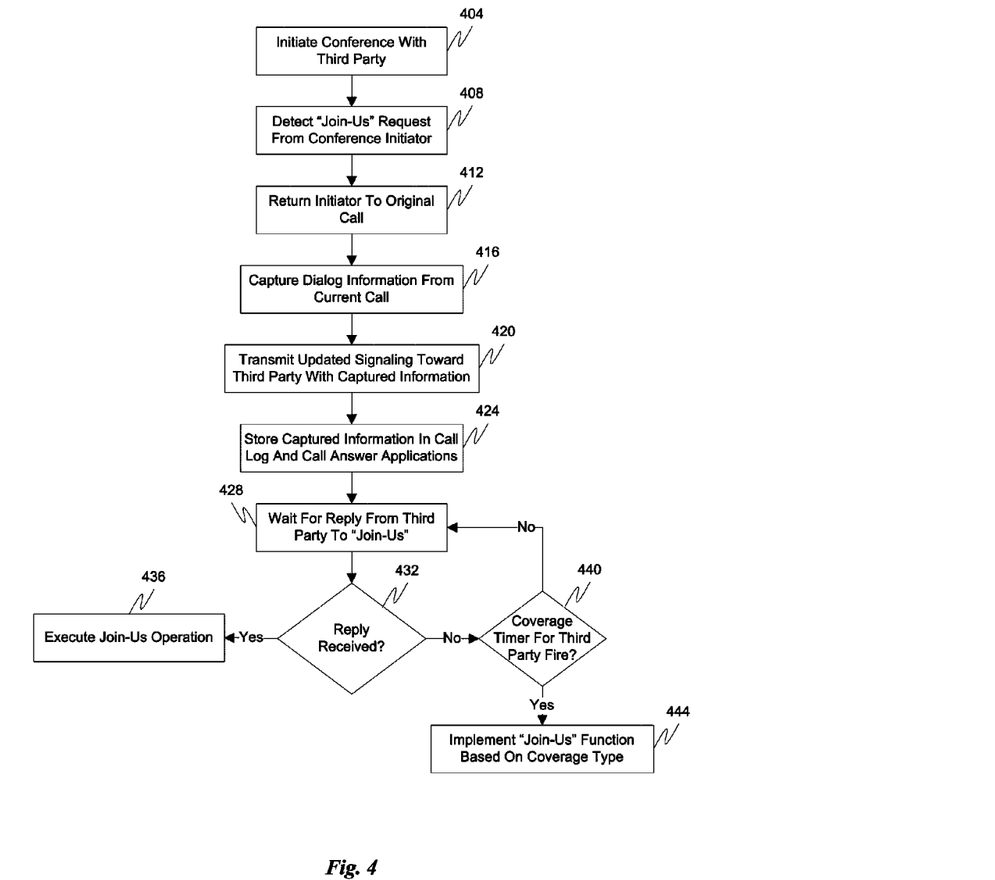
FIG. 4 is a flow diagram depicting a second ad-hoc conferencing method in accordance with embodiments of the present invention.

With advanced User Interface capabilities, the "join-us" invitation may be indicated to the third party even prior to the third party's communication device alerting the user (e.g., before the phone begins to ring). In this case, it may be possible for the third party to respond to the join-us invitation immediately, even before their device begins alerting.

If the third party does not respond to the "join-us" invitation this quickly, the third party device continues to alert until the coverage timer has fired (step 448). If the coverage timer has not fired, then the method returns to step 428. If the call (i.e., "join-us" invitation) is not picked up before the coverage timer fires, the voicemail system (assuming voicemail is the coverage) creates a canned "join-us" message similar to "Leave-word-calling" messages (i.e., a voicemail feature that allows people within a company to leave a prerecorded message requesting that their call be returned) handled by voicemail 120. Furthermore, a "join-us" function is implemented based on the coverage type (e.g., voicemail, secretary, call-log, etc.) used by the invitee.

If the party-to-be-added has coverage to voicemail 120 and voicemail has answered at the time the join-us button 232 is pressed by the invitee, the voicemail system 120 captures the dialog information and associates it with a message left in the mailbox. The voicemail system 120 subscribes to the call dialog and adds a new "join the call in progress" option for the invitee if the message is accessed while the dialog (i.e., the other conference call between the original participants is still active. The "Return Call" option is always available to launch a fresh call.

If the party-to-be-added has already answered the call when the join-us button 232 is hit by the conference initiator, the party-to-be-added will be immediately added to the ad-hoc conference as normal. No entry tones or name announcements accompany the join in this case. The call log 112 still captures the dialog information allowing the invitee to drop and rejoin as many times as is necessary during the life of the conference dialog. This is particularly useful in cases where the party-to-be-added loses coverage (e.g., cell phone coverage) and has to reconnect with the communication session.

If the invitee has secretarial coverage that has already answered the call when the join-us button 232 is hit, the secretary will be added to the conference and the secretary's call log 112 will show the join information. If the secretary chooses to "transfer the call to voicemail", the voicemail system 120 will detect the join information in the voicemail INVITE and create a "Join-us" canned message as described above, but the information will be retrieved from the principal's mailbox. Of course a conference initiator may choose to delay hitting the join-us button 232 until after speaking with the secretary and being transferred to voicemail 120 where the invitee's greeting is heard and a message may be left. In this case the join information is captured along with the message left for the invitee. The join-us button will terminate the voicemail recorded message and leave dialog information along with the message.

If the invitee's communications equipment is not able to accept the join-us request (success may be indicated by acknowledging the updated signaling), the calling party or initiator hears an error indication indicating the "Join-Us" option is not available. The calling party will then have to use the traditional "conf" and "drop" commands to manage the establishment of the conference.

While the above-described flowchart has been discussed in relation to a particular sequence of events, it should be appreciated that changes to this sequence can occur without materially effecting the operation of the invention. Specifically, a device can address a third party without leaving an existing communication session as long as signaling and addressing occurs outside the audio channel. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for facilitating an ad-hoc conference. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A conferencing method, comprising:
receiving a join-us request from a first user that is currently engaged in a communication session with a second user, wherein an intended recipient of the join-us request is a third user, and wherein the communication session is established over a telecommunication network;
transmitting the received join-us request over the telecommunication network to the third user as a call from the first user to the third user;
allowing the first user to engage in the communication session with the second user before the third user responds to the join-us request;
subscribing to ongoing state information for the communication session;
determining that an ongoing state of the communication session has changed from a first state to a second different state; and
altering the join-us request to reflect the change in the ongoing state of the communication session.

2. The method of claim 1, wherein the intended recipient of the join-us request further comprises at least a fourth user, the method further comprising:
transmitting the join-us request to the at least a fourth user as a call from the first user to the fourth user; and
selectively connecting the third user and the at least a fourth user to the communication session based on their respective response to the join-us request.

3. The method of claim 1, further comprising:
retrieving dialog information related to the communication session; and
including the dialog information in the join-us request.

4. The method of claim 3, further comprising:
storing the dialog information in a call log associated with the third user;
subscribing, by a communication device associated with the third user, to dialog events of the communication session;
generating a join-us response input; and
displaying the join-us response input on the communication device associated with the third user.

5. The method of claim 4, further comprising:
determining that the third user has selected the join-us response input;
determining a state of the communication session; and
initiating a call from the third user to the first user, wherein the communication session is determined to be in an active state and wherein the dialog information is used to initiate the call from the third user to the first user.

6. The method of claim 3, wherein dialog information comprises at least one of bridge identification information, a participant code, a password, contact information associated with the first user, information related to at least one of the first and second participant, and contact information associated with the second user.

7. The method of claim 1, further comprising:
receiving a response to the join-us request from the third user;
determining whether the communication session is in an active state; and
preparing a communication from the third user to the first user and conditioning the communication based on the determination of whether the communication session is in an active state.

8. The method of claim 1, further comprising:
alerting the third user with a specialized alert that indicates to the third user that the incoming call is a join-us request.

9. The method of claim 8, further comprising:
determining that a coverage timer has fired for the third user;
sending the join-us request to coverage; and
conditioning possible response options to the join-us request based on the type of coverage to which the join-us request has been sent.

10. The method of claim 9, wherein the coverage type comprises voicemail and wherein the dialog information is captured and stored in voicemail, the method further comprising:
bridging the third user to voicemail;
receiving a response to the join-us request from the third user; and
joining the third user to the communication session with at least one of an entry tone and recorded name, wherein the voicemail provides the at least one of an entry tone and recorded name as the third user joins the communication session.

11. A non-transitory computer readable medium comprising processor executable instruction operable to perform the method of claim 1.

12. The method of claim 1, wherein the on-going state of the communication session is one of active or ended.

13. The method of claim 1, wherein the altering is altering a call log content of the join-us request.

14. A first communication device associated with a first user, the first communication device configured to connect with a second communication device associated with a second user thereby establishing a communication session between the first and second users, the first communication device being further configured to receive a join-us request from the first user that is currently engaged in the communication session, transmit the received join-us request as a call to a third communication device associated with a third user, and allow the first user to engage in the communication session before the third user responds to the join-us request, wherein the third communication device is further operable to subscribe to ongoing state information for the communication session, determine that an ongoing state of the communication session has changed from a first state to a second different state, and in response to making such a determination, alter the join-us request to reflect the change in the ongoing state of the communication session.

15. The devices of claim 14, wherein an intended recipient of the join-us request further comprises at least a fourth user, and wherein the first communication device is further operable to transmit the join-us request to the at least a fourth user while simultaneously transmitting the join-us request to the third user.

16. The devices of claim 14, wherein the first communication device is further operable to retrieve dialog information related to the communication session, and include the dialog information in the join-us request.

17. The devices of claim 16, wherein the dialog information is stored in a call log associated with the third user that allows the third communication device to subscribe to dialog events of the communication session.

18. The devices of claim 17, wherein during subscription to the dialog events, the third communication device is operable to determine that the third user has selected the join-us response input, determine a state of the communication session, and initiate a call to the first user, wherein the communication session is determined to be in an active state and wherein the dialog information is used to initiate the call from the third user to the first user.

19. The devices of claim 16, wherein dialog information comprises at least one of bridge identification information, a participant code, a password, contact information associated with the first user, information related to at least one of the first and second participant, and contact information associated with the second user.

20. The devices of claim 14, wherein the third communication device is further operable to receive a response to the join-us request from the third user, determine whether the communication session is in an active state, and prepare a communication to the first user and condition the communication based on the determination of whether the communication session is in an active state.

21. The devices of claim 14, wherein the first communication device is further operable to prepare a specialized alert for the third user that indicates to the third user that the incoming call is a join-us request.

22. The devices of claim 14, wherein after a coverage timer has fired for the third user the join-us request is sent to coverage and possible response options to the join-us request are conditioned based on the type of coverage to which the join-us request has been sent.

23. The devices of claim 22, wherein the coverage type comprises voicemail and wherein the dialog information is captured and stored in voicemail such that the third communication device is bridged to voicemail when a response to the join-us request is received from the third user.

24. The devices of claim 14, wherein the on-going state of the communication session is one of active or ended.

* * * * *